July 22, 1958 W. M. ZGRAGGEN 2,843,952
MULTI-SIGNALLING DEVICE FOR VEHICLES
Filed Dec. 17, 1954 2 Sheets-Sheet 1
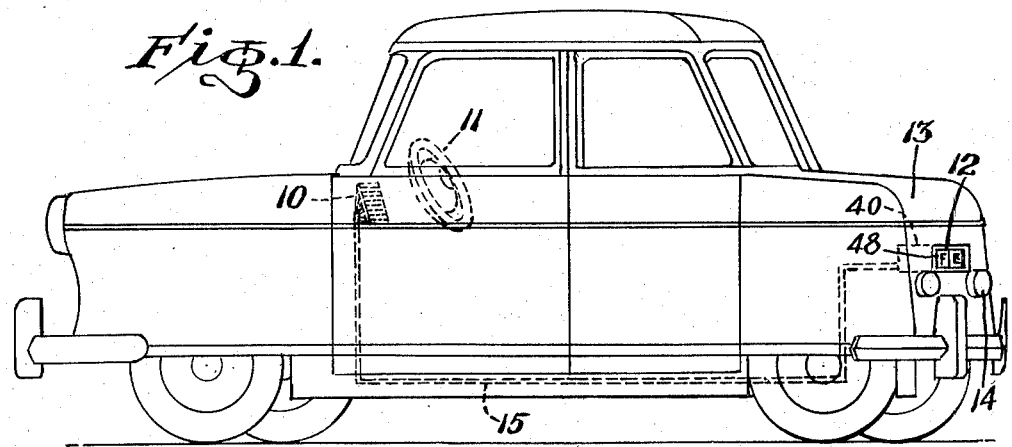
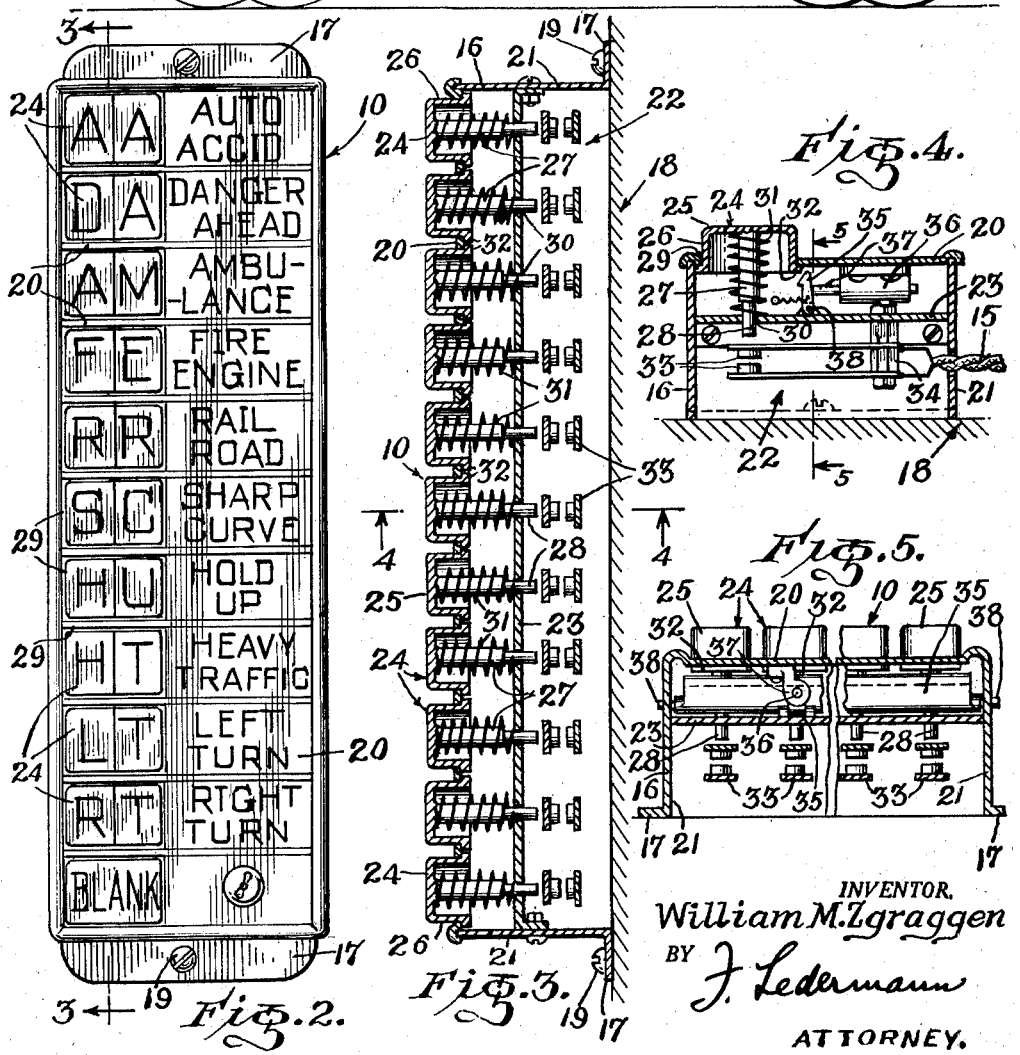
INVENTOR.
William M. Zgraggen
BY F. Ledermann
ATTORNEY.

July 22, 1958 W. M. ZGRAGGEN 2,843,952
MULTI-SIGNALLING DEVICE FOR VEHICLES
Filed Dec. 17, 1954 2 Sheets-Sheet 2
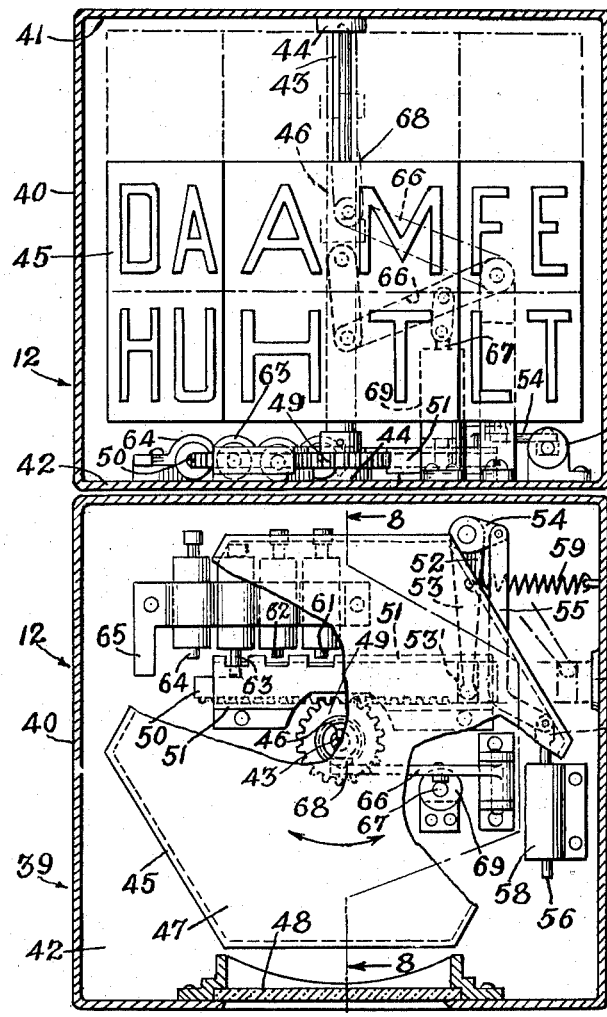
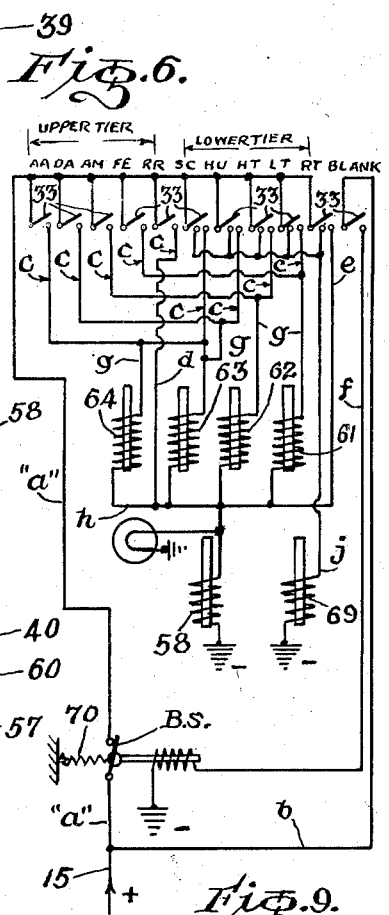
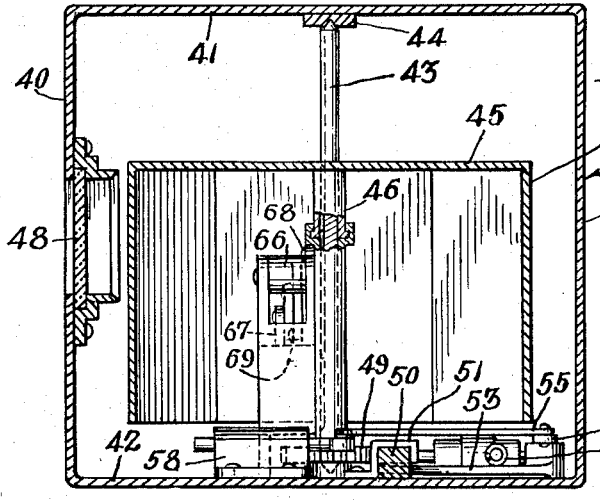
INVENTOR.
William M. Zgraggen
BY
J. Ledermann
ATTORNEY United States Patent Office 2,843,952
Patented July 22, 1958

2,843,952

MULTI-SIGNALLING DEVICE FOR VEHICLES

William M. Zgraggen, New York, N. Y.

Application December 17, 1954, Serial No. 476,018

1 Claim. (Cl. 40—52)

This invention relates to a safety signalling device operable by the driver of a vehicle to advise the motorists behind him of a condition or circumstance ahead so that the latter may be informed in advance of, among other things, an intention to slow down, to turn, or some other action on his part, together with an explanation of the cause of such action, as a result of which many accidents may be avoided, and in some cases needed aid or even rescue may result.

The primary object of the present invention is the provision of a signalling system capable of instantly warning the driver or persons behind, of the existence ahead of an impending road hazard or of any other of a variety of circumstances or intended variations in the movement of the vehicle driven by the one who is giving the signal.

Another object of the invention is the provision of a compact signalling device operable by a push button control located proximate to the driver, which can readily be mounted at the rear or other advantageous position of the vehicle and which will selectively signal to other vehicles advising the drivers of a large variety of events discernable only by the driver of the signalling vehicle.

A further object of the invention is the provision of a signalling device of the character mentioned, which includes a rotatable set of signals indicative of a variety of circumstances or traffic conditions ahead, operable selectively by electromagnetic means actuated by a push button dial having indicia corresponding with the signals emitted to other drivers, whereby the simple actuation of one of the push buttons causes the desired signal to be visibly displayed for the benefit of an adjacent motorist and wherein the signal can be maintained displayed any desired length of time.

The above as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing, Fig. 1 is a perspective view of an automotive vehicle equipped with one embodiment of the novel signalling system of this invention.

Fig. 2 is an elevational view of the push button control showing the coded control buttons and the accompanying legends thereof.

Fig. 3 is a longitudinal sectional view taken on the line 3—3 of Fig. 2.

Fig. 4 is a transverse sectional view taken on the line 4—4 of Fig. 3, showing further details of one of the push button switches.

Fig. 5 is a longitudinal sectional view taken on the line 5—5 of Fig. 4, showing further details of the switch mechanism.

Fig. 6 is a front elevational view, with parts broken away and partly in section, of the signal unit which is mounted visibly on the vehicle.

Fig. 7 is a plan view of the signal unit, with parts broken away and partly in section.

Fig. 8 is a longitudinal sectional view taken on the line 8—8 of Fig. 7.

Fig. 9 is a schematic wiring diagram of the central control and the signal unit.

Referring in detail to the drawing, the control board assembly 10 is mounted by conventional means on the vehicle dashboard in close proximity to the steering wheel 11. The signal unit 12 is likewise mounted, in an external vehicular compartment 13, preferably located above a tail light 14. It should be noted that the locations shown herein of the control and the signal unit are merely for the purpose of illustration, as other locations may be provided for the unit. However, the location shown in Fig. 1 is the most suitable for ordinary purposes. Current which operates the signal unit 12 is controlled by the control board buttons and flows through wiring incorporated in the cable 15 connecting the board 10 with the signal unit 12.

The control board 10 comprises a bracket 16 having flanges 17 mounted to the dashboard 18 by means of screws or the like 19. An outer plate 20 is joined integrally to the closure walls 21 which encompass an internal compartment 22 which is subdivided by a transverse guide plate 23 spaced from and parallel with the plate 20. An aligned series of push buttons 24 each provided externally with reference symbols, is mounted reciprocally in apertures through the plates 20 and 23. The symbols are abbreviations or initials of words descriptive of various possible conditions or intended vehicle movements. Adjacent each symbol are the words indicative of the information to be signalled. Each push button unit further comprises an external cap 25 having an outer flange 26 and an inwardly projecting rod 27 which includes a reduced end 28. The flange 26 projects slidably through an aperture 29 through the plate 20, and the end 28 projects slidably through a smaller hole 30 through the plate 23. A spring 31 surrounds the rod 27 with one end abutting plate 23 and the other end urging the cap 25 outwardly. A peripheral lip 32 projects laterally from the flange 26 and engages the plate 20, owing to pressure of the spring 27. To actuate one of the push buttons, inwardly directed manual pressure is exerted, forcing the end 28 inward toward the normally spaced contact points 33 which are spring cantilevered from the support 34 secured to the plate 23. When the larger portion of the rod 27 contacts plate 23, the reduced end 28 will have forced points 33 into engagement thus completing a circuit which results in emission of a signal corresponding to the symbol of the push button actuated. The latter is retained in the circuit-closing position by a dog 35 which is spring pressed towards the flange 26. Inward movement of the push button causes the lip 32 to press the dog 35 away from the flange 26, thus allowing further inward movement of the push button. Upon manual release of the push button, the spring 31 forces the button outwardly. However, the push button is prevented from returning to the initial position by the dog 35 which retentively engages the lip 32, until a solenoid 36 is energized to displace momentarily the dog 35 from the path of the lip 32. Since the solenoid actuating pin 37 is normally biased away from the axis of the rod 27, the dog 35 will be forced to resume its initial position when the solenoid 36 is de-energized. As will later be described more fully, the solenoid is energized by a circuit controlled by the push button bearing the legend "blank." Thus the signal emitted upon actuation of any of the push buttons ceases when the driver actuates the button labeled "blank." The dog 35 is a continuous plate extending the full length of the control board and is pivoted along its inner end to the closure walls 21 by the shaft 38.

The signal assembly 39 comprises a housing 40 which includes spaced top and bottom walls, or a roof and floor 41 and 42, respectively, enclosing a compartment in which the signalling mechanism is contained. A vertical shaft 43 is rotatably mounted in bearings 44 secured internally to the walls 41 and 42, and a hexagonal signal wheel 45 is rotatably keyed about the shaft 43 by the sleeve 46. The keyed connection between the sleeve 46 and the shaft 43, however, permits relative axial movement. The side walls 47 of the wheel 45 include two circumferential tiers of symbols corresponding to the labelling of push buttons. The instant embodiment involves the various signals and a blank. To provide a signal adequately large without unduly increasing the size of the wheel 45, the two-tier arrangement has been devised, each tier including five signals and one blank, thus providing a total of twelve positions coinciding with the number of available spaces afforded by the hexagonal shape. The wheel 45 is movable axially relative to positions wherein each tier is aligned with a window 48 provided in one of the side walls 40. This window is large enough to permit a signal symbol to be readily seen by an adjacent motorist. Such conventional means as electric lights or phosphorescent means can be additionally employed to illuminate the symbol aligned with the window 48, thereby increasing the visibility thereof, especially at night.

The wheel 45 is rotated by means of a pinion 49 secured to the base of shaft 43 and a coacting rack 50 which reciprocates transversely to the axis of the shaft 43 within the guide track 51. The rack 50 is actuated by a bell crank 52 having a lever 53 reciprocally pivoted in a slot 53' in the rack 50. The bottom wall 42 has the bell crank pivotally secured thereto, and the bell crank also includes another lever 54 hinged to a link 55. A solenoid rod 56 is pivotally secured to the link 55 at the pivot point 57 whereby energization of the solenoid 58 results in transverse reciprocation of the rack 50 and the accompanying rotation of the wheel 45. The solenoid is energized by the manual actuation of any control board push button except the button bearing the legend "blank." A spring 59 biases the rack 50 toward a stop 60 mounted on a side wall 40 and corresponding to the "blank" position wherein no signal is displayed, through the window 48. Actuation of the solenoid 58 causes counter-clockwise wheel rotation which is selectively restricted predeterminedly by a series of solenoid stops 61, 62, 63 and 64. Each of these stops is caused to move into a position obstructing the rack movement resulting from energization of the solenoid 58. Moreover, the obstructing movement of each of these stops corresponds to actuation of two predetermined push buttons which in turn correspond to two symbols vertically adjacent on the wheel 45. For example (Fig. 6), the vertically adjacent symbols DA and HU constitute a pair of symbols controlled by stop 64; symbols AM and HT correspond to a pair controlled by stop 63; and so forth. Thus actuation of, for example, push buttons DA or HU will cause the inward movement of stop 64 to obstruct the movement of the rack 50. The magnitude of the rack movement which results in contact with stop 64, corresponds to a rotary movement of the wheel 45 sufficient to align horizontally the symbols DA and HU with the vertical axis of the window 48. Of these two symbols, only one will be displayed through the window, depending upon the position of the sleeve 46 relative to the shaft 43. Each of the other solenoid stops 61, 62 and 63 is similarly related to three other sets of vertically adjacent symbols. The solenoid stops are also energized by the manual actuation of the control board push buttons. A fifth fixed stop 65 restricts movement of the rack 50 at a point corresponding to a fifth set of vertically adjacent wheel symbols which likewise correspond to the depression of either of a pair of similarly labeled push buttons. It is thus apparent that eight symbols are controlled by the variable solenoids stops 61, 62, 63 and 64; two symbols by the fixed stop 65 and the two "blank" positions by the opposite fixed stop 60.

Axial movement of the wheel 45 relative to shaft 43 is attained by a lever linkage 66 transmitting the movement of a solenoid rod 67 to the sleeve 46. The connections between the linkage 66 and the sleeve 46 is of a conventional form which permits rotation of the sleeve about its axis in relation to the connecting link 68. Consequently, sleeve 46 can freely rotate about shaft 43 at all times without retardation from linkage 66. The rod 67 is actuated when the solenoid 69 is energized to lift sleeve 46 and the wheel 45 relative to the shaft 43, sufficiently to align the lower tier of symbols with window 48. This lifting movement occurs only when certain predetermined push buttons are actuated, corresponding to the symbols in the lower tier of the wheel 45. Thus the actuation of the latter push buttons simultaneously actuates rack solenoid 58, variable stops 61, 62, 63 and 64, and the lifting solenoid 69, causing the display of a lower tier signal, or symbol.

For an understanding of the circuit which controls the solenoid movements described, reference is had to Fig. 9 wherein a wire $a$ connects the positive terminal of a source of current with one of the contact points 33 of each push button assembly previously described, with the exception of the button labeled "blank." Thus the push buttons are in a parallel circuit relationship. A circuit parallel to the latter circuit includes the "blank" button and is provided by the circuit leg $b$ which is connected to a control point 33 of the "blank" push button assembly. A solenoid actuated blanking switch B. S. is in series with the "blank" button and is utilized to control the current through circuit leg $a$. A spring 70 biases switch B. S. to the closed position. Consequently actuation of the "blank" button energizes the solenoid which moves the switch B. S. to the open position, breaking the circuit through leg $a$. Circuit legs $c$ leading from the control points 33 of each of the push buttons marked AA, DA, AM, FE, SC, HU and LT are connected to legs $g$, each of the latter being connected to the solenoids energizing the variable stops 61, 62, 63 and 64. It should be noted that the buttons AA and SC, DA and HU, AM and HT, FE and LT, form four pairs, each pair being in a circuit involving the same variable stop. For example, AA and SC are connected to variable stop 64. All of the variable stops of the solenoids are connected to circuit leg $h$ which is in turn connected to the solenoid 58, the actuating means for the rack 50. The solenoid 58 is then grounded or connected to the negative terminal of the source of current. Push button RR is not tied in with a variable stop since the signal corresponding to the actuation of RR is related to the fixed stop 65. Thus circuit leg $d$ is connected directly to the circuit leg $h$ which as aforesaid leads to the driving rack solenoid 58.

Each of the push buttons SC, HU, HT, LT, and RT is in one of five parallel circuits leading from the negative side of the contact points 33. Except for RT, one of the parallel leads of each of the said groups has been described as a circuit leg $c$ leading to one of the aforementioned variable stops 61, 62, 63 or 64; the other parallel leads of the same group are all connected to a circuit leg $j$ which in turn feeds the lifting solenoid 69, Fig. 6. One of the parallel leads from the RT control points is connected with the drive rack solenoid 58, through leg $h$ and the other lead is directly tied to leg $j$. Since the RT signal corresponds to the rack position determined by stop 65, no connection is required to the circuit actuating the solenoid controlled variable stops.

The lifting solenoid 69 is thus grounded, as shown, or connected to the negative pole of the current source, not shown. Completing the circuit through the "blank" push button is a circuit leg *f* which is tied in with the grounded switch B. S.

To display the signal corresponding, for example, to either AA, DA, AM or FE, the selected button is depressed manually, causing circuit completion by the contact points 33. The dog 35 prevents the push button from returning to the inoperative position and the rack 50 is actuated to rotate the signal wheel 45. Simultaneously, the variable stop connected to the actuated push button is motivated to restrict rotation of the wheel to a position wherein the selected signal symbol is aligned with the window 48. The wheel will remain thus until the "blank" button is actuated, resulting in retracting movement of dog 35 under the influence of solenoid 36 in the blanking circuit. Retraction of dog 35 permits spring 31 to press the push button outward, thus opening the circuit at contact points 33. At the same time the blanking switch B. S. is actuated to further open the push button circuit. With the circuit thus broken, solenoid 58 is deenergized, permitting the spring biased lever 53 to force the rack back to stop 60 corresponding to the display of the "blank" symbol through window 48. The "blank" push button does not include a retaining dog 35 and will consequently return to the original inoperative position automatically due to the spring bias.

The symbol corresponding to the push button RR is realized in the same manner except that the fixed stop 65 is utilized to restrict the signal wheel movement.

To display a symbol in the lower tier of the wheel, a push button connected to the lifting lever 69 is actuated. The resulting chain of events is identical except that the lifting linkage 66 is motivated by the energization of the solenoid 69. Thus the signal wheel is raised as it revolves. For example, symbol HT is attained by the same rotation of the signal wheel as that required for the signal AM. Both of the push buttons controlling HT and AM actuate the same stop 62. However, if HT is actuated the lifting solenoid causes the lower tier of symbols to move into the level of window 48.

It is now apparent that the disclosed device provides a compact and useful unit adapted for simple installation in any of a variety of positions, capable of emitting a variety of traffic signals, and wherein the displayed signal can be maintained as long as desired.

The particular number and type of symbols herein disclosed is presented only as an illustration of the possible functions of the device, and obviously they may be varied without departing from the spirit or scope of the invention.

I claim:

In a visual signalling system, an upright cubical housing having a roof and a floor, a window opening located intermediate the roof and the floor, a vertically disposed axial shaft rotatable in said housing, a wheel including an axial sleeve slidably mounted on said shaft, said wheel having a horizontally disposed circumferential flange, carrying indicia in two axially spaced tiers, said wheel including said sleeve and said flange having an axial length substantially equal to two-thirds of the height of said housing, said spaced tiers of indicia being adapted to be selectively displayed through said window, said wheel being normally positioned in its lowermost position in the housing with the upper tier of indicia in the plane of the window, a linkage connected to said sleeve, electromagnetic means associated with said linkage for raising said wheel from said normal position to position the lower tier of indicia in the plane of the window when energized and permitting said wheel to be lowered to normal position by gravity when deenergized, a second electromagnetic means associated with said wheel for rotating said wheel to position any one of said indicia in one of said tiers adjacent said window, including a single pinion secured to the lower end of said shaft and a rack slidably mounted upon said floor in meshing engagement with said pinion, a plurality of movable stops for stopping rotation of said wheel, means for actuating any one of said stops selectively to stop rotation of the wheel when a selected indicia is positioned adjacent the window, each of said tiers including a blank, said blanks being positioned in vertical alignment on the wheel, said wheel being further normally positioned with the blank of the upper tier adjacent said window.

References Cited in the file of this patent

UNITED STATES PATENTS

| 593,884 | Gowans | Nov. 16, 1897 |
| 944,003 | Sohm | Dec. 21, 1909 |
| 1,068,076 | Queen | July 22, 1913 |
| 1,382,079 | Greer | June 21, 1921 |
| 1,435,474 | Jackson | Nov. 14, 1922 |

FOREIGN PATENTS

| 17,978/11 | Great Britain | Feb. 22, 1912 |